United States Patent [19]
Ishiwatari et al.

[11] 4,261,042
[45] Apr. 7, 1981

[54] KEY SIGNAL ENTERING DEVICE FOR THIN ELECTRONIC APPARATUS

[75] Inventors: Masumi Ishiwatari, Zushi; Sakae Horyu, Yokohama; Mitsuaki Seki, Tokyo, all of Japan

[73] Assignee: Canon Kabushiki Kaisha, Tokyo, Japan

[21] Appl. No.: 24,301

[22] Filed: Mar. 27, 1979

[30] Foreign Application Priority Data

Mar. 28, 1978 [JP] Japan .................................. 53-35657
Mar. 28, 1978 [JP] Japan .................................. 53-35658

[51] Int. Cl.³ .......................... G06F 1/00; H05K 1/00
[52] U.S. Cl. .................................. 364/709; 174/68.5; 339/17 L; 340/365 L; 361/398; 364/712
[58] Field of Search ............... 364/709, 712; 200/292, 200/295, 5 A; 174/68.5, 120 R, 120 AR, 117 PC; 339/17 F, 17 L; 361/398; 307/231; 340/365 R, 365 C, 365 L; 350/338, 342, 345

[56] References Cited

U.S. PATENT DOCUMENTS

| | | | |
|---|---|---|---|
| 3,699,294 | 10/1972 | Sudduth | 200/5 A |
| 3,734,598 | 5/1973 | Aiken | 350/338 |
| 3,748,018 | 7/1973 | Borden, Jr. | 350/338 |
| 3,911,234 | 10/1975 | Kotaka | 200/5 A |
| 3,963,906 | 6/1976 | Yamamura et al. | 364/709 |
| 4,081,898 | 4/1978 | Taylor, Jr. et al. | 364/712 |
| 4,096,577 | 6/1978 | Ferber et al. | 364/712 |
| 4,104,728 | 8/1978 | Kasubuchi | 364/712 |

Primary Examiner—Errol A. Krass
Attorney, Agent, or Firm—Fitzpatrick, Cella, Harper & Scinto

[57] ABSTRACT

A key signal entering device for thin electronic apparatus comprises paired electrodes provided on an insulating substrate, an anisotropically electroconductive sheet disposed on said electrodes and a layer of an electroconductive material disposed thereon. A key signal is generated by selectively pressing said device from above to modify the electroconductive area in the thickness direction of said anisotropically electroconductive sheet thereby electrically connecting said electrodes with said electroconductive layer. An alternative device comprises an anisotropically electroconductive sheet sandwiched between flexible sheets having electrodes arranged in mutually facing relationship, wherein a key signal is generated by pressing said flexible film to render said anisotropically electroconductive sheet conductive thereby electrically connecting electrodes on said flexible sheets.

16 Claims, 19 Drawing Figures

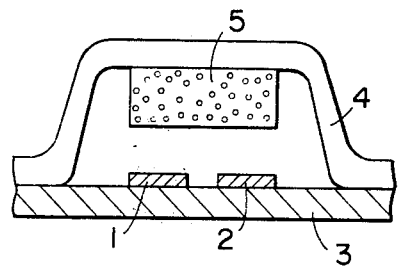
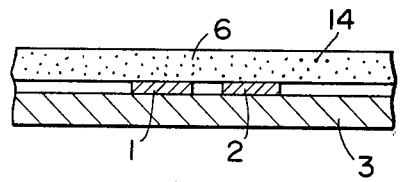
FIG. 1  FIG. 2
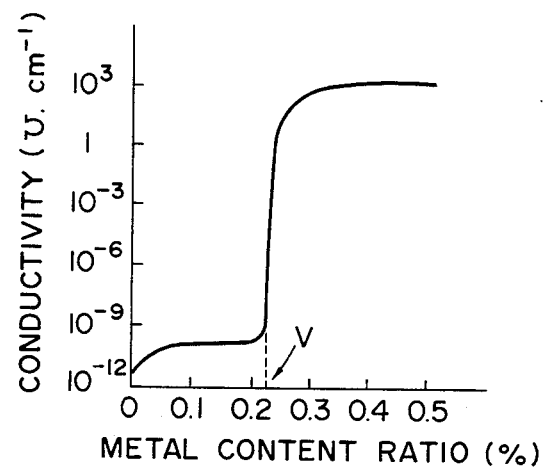
FIG. 3
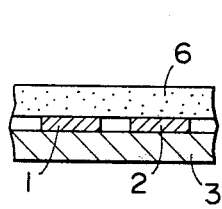 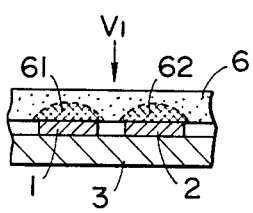 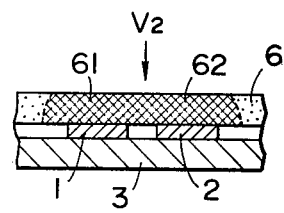
FIG. 4A  FIG. 4B  FIG. 4C
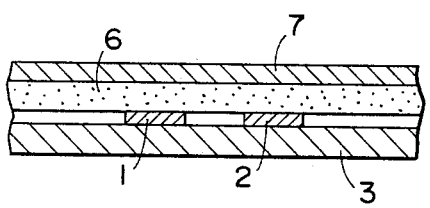 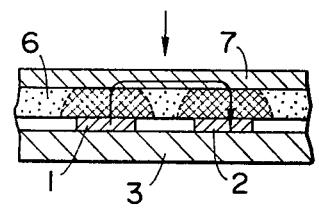
FIG. 5  FIG. 6

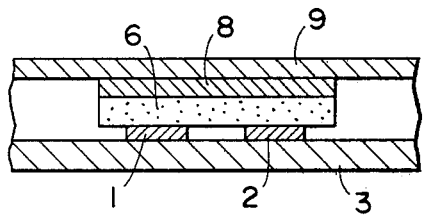
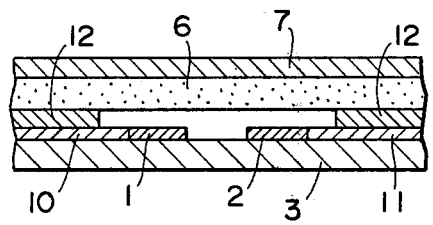
FIG. 7    FIG. 8
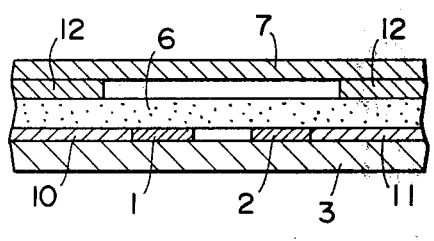
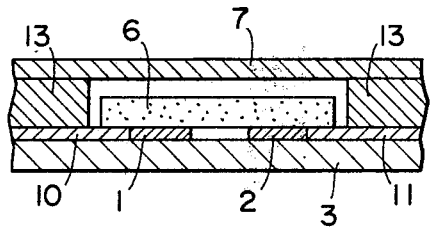
FIG. 9    FIG. 10
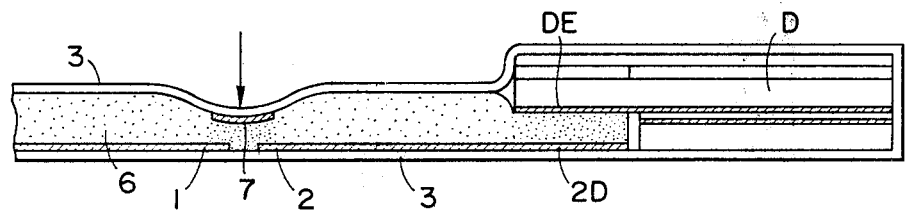
FIG. 11

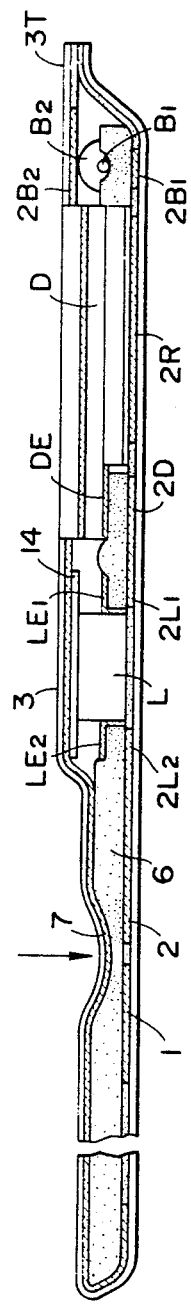
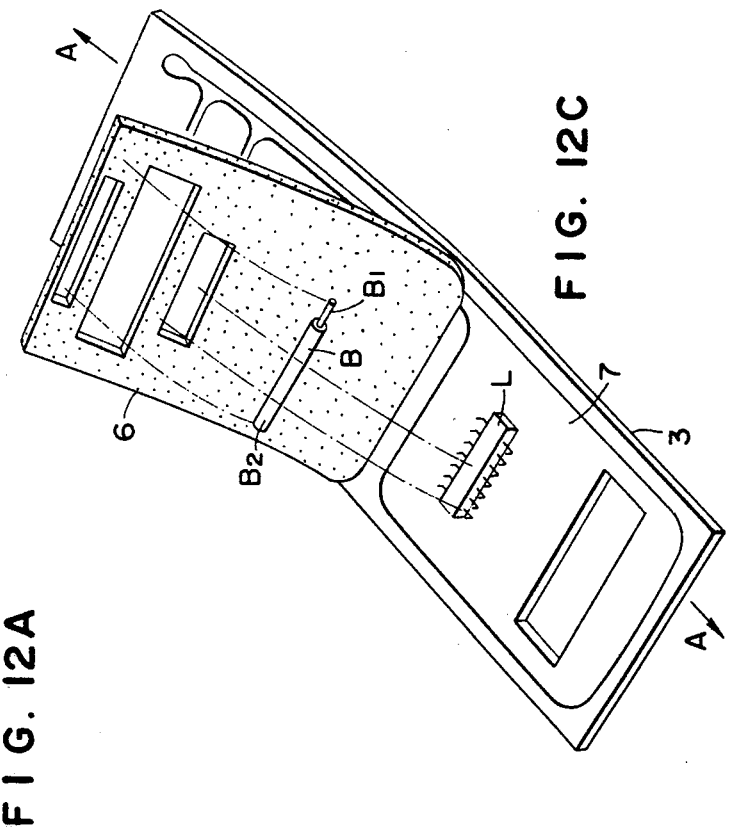
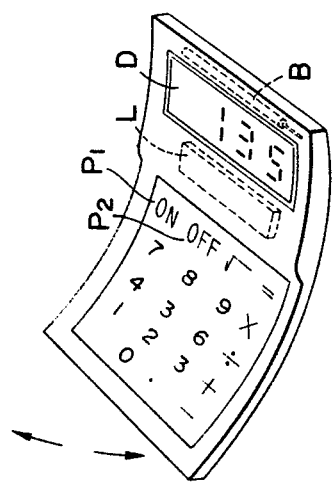
FIG. 12A
FIG. 12C
FIG. 12B

KEY SIGNAL ENTERING DEVICE FOR THIN ELECTRONIC APPARATUS

BACKGROUND OF THE INVENTION

1. Field of the Invention

The present invention relates to a thin electronic apparatus such as an electronic desk-top calculator, and more particularly to a flexible electronic apparatus of a thickness in a range of from 2 to 2.5 mm.

2. Description of the Prior Art

In the construction of a thin flexible electronic apparatus for example a calculator, certain features require particular consideration different from those in the conventional rigid calculator. One of such features is the power switch which has generally been placed on a side face of the calculator but has now to be provided on the same face as the keyboard as the thickness of the calculator reduces. Also the switch mechanism has widened from the conventional mechanical rocking switch to a switch utilizing the setting and resetting of an electronic flip-flop circuit. In such structure it is vitally necessary to avoid the waste of battery power resulting from unexpected turning on of the power switch.

Particularly in a calculator as flexible as a cash card or a credit card, a mechanical-contact type keyboard utilizing for example electroconductive rubber is extremely disadvantageous due to the possibility of unexpected turning on of the power switch. The same drawback is encountered when the calculator is carried in a flexible pocket-book case or card case.

SUMMARY OF THE INVENTION

In consideration of the foregoing, the present invention provides an electronic apparatus extremely suitable for carrying, which is free from the possibility of unexpected turning on of the power switch even when the keyboard is severely bent.

BRIEF DESCRIPTION OF THE DRAWINGS

FIG. 1 is a schematic view of a conventional key signal entering device;

FIGS. 2 and 4A, 4B and 4C are schematic views showing the principle of the present invention;

FIG. 3 is a graphical representation for explaining the principle of the present invention;

FIGS. 5 and 6 are views of an embodiment of the present invention;

FIGS. 7, 8, 9 and 10 are views of another embodiment; and

FIGS. 11, 12A, 12B and 12C, 13, 14 and 15 are views of electronic apparatus embodying the present invention.

DESCRIPTION OF THE PREFERRED EMBODIMENTS

Figure 13:
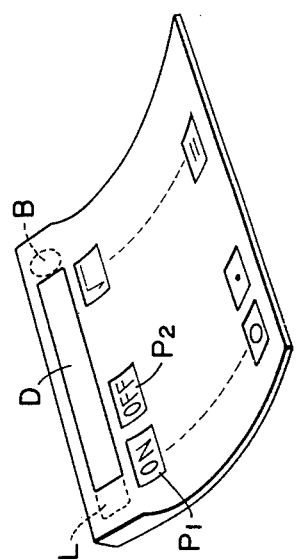

In FIG. 1 there is shown a conventional key switch wherein the switching function is achieved by pressing down a conductive rubber piece 5 adhered to an insulating rubber sheet 4 to shortcircuit electrodes 1, 2 provided on an insulating substrate 3. Such structure, however, cannot be made very thin since the conductive rubber piece has to be separated by a certain distance from said electrodes. If said conductive rubber piece 5 is positioned excessively close to the electrodes 1, 2 for achieving a thinner structure, a secure switching operation can no longer be expected since an eventual slack of the insulating rubber sheet 4 will result in the contact of the conductive rubber piece 5 with the electrodes 1, 2. Such drawback cannot be avoided in a structure wherein the conductive rubber piece 5 is formed into a sheet as disclosed in the U.S. Pat. No. 3,699,294. Also it will be apparent that the above-mentioned structure will lead to an undesired closing of the switch if it is rendered flexible and bent. Such undesired switching is effectively prevented by the keyboard of a structure as shown in FIG. 2 comprising electrodes 1, 2 provided on an insulating substrate 3 and an antisotropically conductive sheet 6 (for example a sheet known under a trade name of CHO-NECTOR manufactured by Comelix Co., U.S.A.) composed of a macromolecular material including metal particles 14 therein, so that said electrodes 1, 2 are shortcircuited by pressing said sheet 6. Said sheet is for example composed of a silicone polymer sheet of a minimum thickness of ca. 130 microns in which dispersed are spherical conductive particles such as nickel particles of a diameter in the range of ca. 150 to 230 microns. As shown in FIG. 3 the content ratio of said conductive particles in the material is slightly smaller than the content ratio V at which the electroconductivity shows a steep increase, to achieve an anisotropically conductive property whereby the sheet becomes conductive only in the thickness direction in the portions in contact with said electrodes but remains insulative in the lateral direction. Such property is explained in the Nikkei Electronics, 1975, April 7 issue, pages 31 to 37. In such sheet the electroconductive area is not formed by mere contact of the sheet with the electrodes but requires a certain pressure in the thickness direction. FIG. 4 shows the change in the extent of the conductive area in said sheet 6 under different pressures. As shown in FIG. 4A the sheet 6 has no conductive area therein in the absence of external pressure, while it creates hatched conductive areas 61, 62 as shown in FIG. 4B under a certain external pressure V1 causing a firm contact of the sheet 6 with the electrodes 1, 2, and the conductive areas spread as shown in FIG. 4C under a higher pressure V2 to mutually electrically connect the electrodes 1, 2. This conduction is presumably due to a fact that the sheet 6, having a rubber-like elasticity, contracts under the pressure V2 whereby the volume density of the nickel particles in the sheet 6 is varied to exceed the aforementioned point V in FIG. 3. The use of such sheet is particularly preferable for the manufacture of a keyboard of such structure as this allows an arbitrary arrangement of the keys and eliminates the necessity of key registrations. Such sheet has in fact been developed as a connector for example for liquid crystal display devices as explained in the foregoing reference and has to be used as such connector under a controlled pressure since an excessively high pressure will result in shortcircuiting between the neighboring terminals. However, in the use for a keyboard, this limitation need not be considered since the keys are actuated selectively, usually one at a time.

On the other hand, the large-scale integrated circuit for the calculator, with the recent reduction in power consumption achieved for example by the CMOS structure, is now featured by very high input and output impedances as the result of which the function of the circuit is significantly affected even by a very small leak current between the various electrodes or circuit patterns on the printed circuit board. In order to avoid such trouble the electrodes and circuit patterns are designed to be located as mutually for apart as possible.

Therefore, the structure of FIG. 2 may not provide a secure switching function as will be presumable from FIG. 4B in case the electrodes 1, 2 are arranged mutually distant.

In order to prevent such drawback such a structure as shown in FIG. 4, is particularly preferred in which the structure of FIG. 2 is overlaid by an electroconductive material 7 such as an aluminum foil or a conductive rubber sheet. Upon pressing said conductive material 7 above the electrodes 1, 2, the sheet 6 develops conductive areas as shown in FIG. 6 to achieve electric connection between the electrodes 1, 2 through a channel 1-6-7-6-2.

The structure of FIG. 5 requires a smaller pressure than that required in that of FIG. 2 since the switching in this case is rendered possible by a pressure between V1 and V2 shown in FIG. 4. The structure of FIG. 5, however, may cause shortcircuiting of the circuit patterns eventually located close to the patterns leading from the electrodes 1, 2 to the large-scale integrated circuit.

In such case there is proposed a structure as shown in FIG. 7, in which the sheet 6 is limited to an area located above the electrodes 1, 2 and is supported by an upper cover sheet 9 by means of an adhesive 8. Said adhesive is insulative in case the switch functions as a modification of the structure shown in FIG. 2, or electroconductive in case the switch functions as a modification of the structure shown in FIG. 5, wherein said adhesive 8 functions in a similar manner as the aforementioned conductive material 7. Said upper cover sheet 9 may be electrically conductive or insulating as long as it is flexible.

In case the cutting and pasting work for individual sheet 6 in the structure of FIG. 7 is tedious, there can be proposed a structure as shown in FIG. 8, in which an insulating sheet 12 is inserted between the electrodes 1, 2 or the leads 10, 11 and the sheet 6, said insulating sheet 12 functioning as a spacer and being provided with openings corresponding to said electrodes 1, 2.

Also the structure of FIG. 5 in which the sheet 6 is maintained in direct contact with the electrodes may provide unstable switching function in case the sensitivity of the sheet 6 is locally fluctuating or in case the sheet 6 is inevitably placed under a certain pressure when it is assembled with the electrodes. Such inconvenience can be avoided also by the structure of FIG. 8 in which the sheet 6 is separated from the electrodes unless actuated by a finger.

The insulating sheet 12 used in the structure of FIG. 8 may also be inserted between the sheet 6 and the conductive material 7 as shown in FIG. 9 to likewise achieve a securer switching function, as the sheet 6 is separated in this case from the conductive material 7 unless actuated by a finger.

When the sheet 6 is expensive, it may also be desirable to place the sheet 6 only on the electrodes 1, 2 while maintaining a secure switching function. Such requirement can be achieved by the structure shown in FIG. 10, in which an insulating sheet 13 slightly thicker than the sheet 6 and having apertures corresponding to the electrodes is placed on the patterns 10, 11 while a sheet 6 is placed in each of said apertures, and a conductive sheet 7 is overlaid to cover said sheets 6 and 13. This structure, not requiring adhesion of said sheet 6, allows efficient assembling, and assures secure switching function without the possibility of aforementioned unexpected short-circuiting between the circuit patterns.

The foregoing structures can be utilized in obtaining a thin and flexible calculator if the insulating substrate 3, electrodes 1, 2 and lead patterns 10, 11 are composed as a flexible printed circuit board obtainable by an etching or screen printing method. Also the foregoing structures are applicable not only to the bridge contact type switches for making electric connection between the electrodes 1, 2 but also to the key switches in which the switching contact is made between the electrode 1 and the conductive material 7 through the sheet 6.

FIG. 11 shows an example of the structure of the calculator in which the anisotropically conductive sheet 6 is utilized not only for the key switches but also for the connector for the display device such as a liquid crystal display device, whereby the manufacture and assembly are extremely simplified. In this structure the electrode DE of said display device D is electrically connected to a conductive member 2D through said sheet 6 for performing numerical displays corresponding to the key operations. Also the flexible printed circuit board is folded upward at the end of said display device to achieve an economical unified structure.

In the structure of FIGS. 12A, 12B and 12C, the sheet 6 is further utilized as a connector for the battery B and for the logarithmic arithmetic unit L. As shown in FIG. 12C, the sheet 6 is provided with cutouts in appropriate portions thereof, and the flexible circuit board 3 is folded back over said sheet 6 and is fixed at an end 3T. The battery B is connected at a terminal B1 thereof with a conductive portion 2 of said flexible circuit board 3 through the sheet 6 and directly contacted at the other terminal B2 with a conductive portion 2B2 of the flexible circuit board 3. The latter contact may also be achieved through the sheet 6 if desirable. The leads LE1, LE2 of the logic arithmetic unit L are similarly connected to the conductive portions 2L1, 2L2 of the flexible circuit board 3 through the sheet 6. The upper conductive portion 7 of the flexible circuit board 3 is preferably made as wide as possible to cover the upper face of said logic arithmetic unit 7, thereby achieving a shield effect from external noises. Numeral 14 is an insulating sheet which may be dispensed with if desirable. Also the illustrated structure does not require a particular arrangement for grounding since the flexible circuit board 3 is entirely composed of a single piece for the upper and lower sides. Furthermore, in case the conductive patterns on said flexible circuit board 3 are prepared by evaporation of silver or aluminum or by screen printing with a silver paint, a conductive portion 2R can be utilized as the reflecting plate for the liquid crystal display device D. In this manner the reflecting plate can be dispensed with and the entire structure can be made even thinner.

Figure 14:
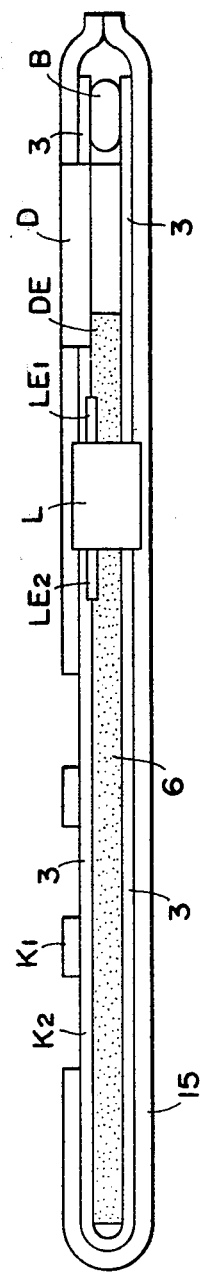

FIG. 13 shows a modification of the arrangement shown in FIG. 12B, in which the battery B and the logic unit L are positioned on both ends of the display device D in order to obtain a wider flexible area. Also FIG. 14 shows an example of structure utilizing a flat battery B which is connected, at both terminals thereof, to the flexible circuit board 3. The logic unit L is placed upside down in comparison with the ordinary case, and is partially embedded in the board 3 and in the external case 15 for preventing increase in thickness as well as for positioning and reinforcing. The leads LE1, LE2 are connected to the flexible circuit board at the lower side through the sheet 6 in a manner similar to the preceding example but may also be connected to the circuit board 3 at the upper side. By utilizing both the upper and lower faces of each lead for making connection in this manner it is rendered possible to shorten the wirings. It is to be noted that such arrangement does not affect the function since in recent large-scale integrated circuits each lead shares its multiple functions identifiable in timing of the signals on that lead in order to reduce the number of leads.

The above-explained three-dimensional wiring allows realization of a higher packing density than in the conventional planar wiring, thus permitting an ideally thin and small calculator to be obtained.

Figure 15:
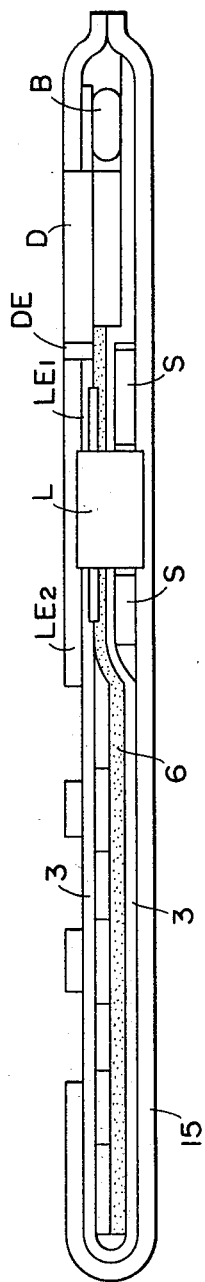

In contrast to the structures shown in FIGS. 12A, 12B, 12C and 13 which will give an unpleasant feeling in the pocket because of a thickness difference between the display portion and the keyboard portion, the structure shown in FIG. 14 is preferable in that the thickness is relatively uniform throughout the calculator. However, in the structures shown in FIGS. 12A, 12B, 12C and 13 the keyboard portion can be realized with a thickness of ca. 0.5 mm or even ca. 0.1 mm and can be wound around the display portion. On the other hand in the structure of FIG. 14 it is possible to provide keytops K1 on the keyboard or to actuate the keys in the recessed portions K2. The external case 15 is to be composed of an insulating flexible material. The anisotropically conductive sheet 6 can be of a thickness to be determined in consideration of the thickness of the logic unit L or of the display device D, said sheet thickness being in a range of 0.1 to 1 mm for the structures shown in FIGS. 12A, 12B, 12C and 13, and of 0.5 to 2 mm for the structure shown in FIG. 14. Said sheet thickness is preferably thinner for achieving a lighter switching operation but has to be determined in consideration of the thickness of said logic unit L or of the display device D. In consideration of such factors, FIG. 15 shows an example having a uniform thickness throughout the entire calculator. The anisotropically conductive and flexible sheet 6 is placed at the bottom side in the keyboard portion for enabling aforementioned key stroke but is bent to the upper side in the vicinity of the logic unit L and the display device D. The leads LE1, LE2 are connected either directly to the flexible circuit board 3 at the upper side or through said sheet 6 to the flexible circuit board 3 of the lower side which is bent upward in a manner similar to said sheet 6. Also there is provided a spacer S between the lower face of the circuit board 3 and the external case 15, and in this manner it is possible to obtain an ultra-thin flexible calculator of a uniform thickness.

According to the present invention, the power switch P1, P2 structured similar to other key switches on the upper face of the calculator as shown in FIGS. 12 and 13 has no danger of unexpected turning on of the power even when the calculator is bent. This is due to the particular property of the anisotropically conductive sheet 6 which disperses the strain resulting from the upward or downward bending of the keyboard and which shows electrical conductivity in the thickness direction only when it is subjected to a vertical pressure in the thickness direction.

Further according to the present invention the display device can be made extremely thin for example with the liquid crystal, electrochromic or PLZT elements, and the battery and the logic unit are located on both end portions or both side portions to protect and reinforce the peripheral areas of the inherently fragile display device, whereby the remaining keyboard portion constitutes a free end portion which can be rendered fully flexible.

What is claimed is:
1. A key signal entering device for a thin electronic apparatus, comprising:
an insulating substrate;
electrodes provided on said insulating substrate;
an anisotropically conductive sheet disposed on said electrodes;
a conductive material layer disposed on said anisotropically conductive sheet; and
a key actuating area located above said electrodes.
2. A key signal entering device according to claim 1, wherein one of said anisotropically conductive sheet and said conductive material layer is selectively provided in a position corresponding to said electrodes.
3. A key signal entering device according to claim 1, wherein said conductive material layer comprises a conductive adhesive.
4. A key signal entering device according to claim 1, wherein said anisotropically conductive sheet is positioned separately from said electrodes.
5. A key signal entering device according to claim 1, wherein said anisotropically conductive sheet is spaced from said conductive material layer.
6. A key signal entering device according to claim 5 wherein said anisotropically conductive sheet is selectively provided in a position corresponding to said electrodes.
7. A thin small electronic apparatus comprising:
a display device;
a circuit board;
an anisotropically conductive sheet connected with said display device and said circuit board; and
key actuating means provided on said anisotropically conductive sheet, wherein a key signal is generated in said circuit board by electric conduction of said anisotropically conductive sheet upon application of a pressure on said key actuating means, a drive signal for said display device being transmitted from said circuit board through said anisotropically conductive sheet.
8. A thin small electronic apparatus according to claim 7, wherein said anisotropically conductive sheet is connected to either a battery or a logic arithmetic unit to achieve electric connection thereof to said circuit board.
9. A thin small electronic apparatus according to claim 7, wherein said circuit board is flexible.
10. A key signal entering device for a thin electronic apparatus, comprising:
an anisotropically conductive sheet;
a first flexible sheet having a first electrode and disposed on said anisotropically conductive sheet; and
a second flexible sheet having a second electrode and disposed under said anisotropically conductive sheet in such a manner that said first and second electrodes are positioned in a mutually facing relationship, whereby in response to application of pressure on said electrodes by a key actuation said anisotropically conductive sheet achieves a change in the conductive area in the thickness direction thereof in a portion contacting said electrodes to form an electric connection therebetween, thereby generating a key signal.
11. A key signal entering device according to claim 10, wherein said flexible sheet having said electrodes comprises a flexible printed circuit board.

12. A key signal entering device according to claim 10, wherein one of said first and second electrodes comprises two terminals which are, in response to the application of pressure, bridged by the other of said first and second electrodes to generate a key signal.

13. An electronic calculator, comprising:
a power source;
a display device;
an arithmetic unit;
a keyboard; and
an anisotropically conductive sheet provided in said keyboard, wherein said anisotropically conductive sheet is flexible at least in a portion thereof corresponding to said keyboard.

14. An electronic calculator according to claim 13, wherein said power source is a battery, said display device is a liquid crystal display device, and said arithmetic unit comprises a large-scale integrated circuit.

15. An electronic calculator according to claim 13, wherein said power source, display device and arithmetic unit are positioned collectively at an end of the calculator apart from the keyboard.

16. An electronic calculator according to claim 13, wherein said keyboard comprises flexible printed circuit boards provided on and under said anisotropically conductive sheet.

* * * * *

UNITED STATES PATENT AND TRADEMARK OFFICE
CERTIFICATE OF CORRECTION

PATENT NO. : 4,261,042
DATED : April 7, 1981
INVENTOR(S) : Masumi Ishiwatari et al.

It is certified that error appears in the above-identified patent and that said Letters Patent is hereby corrected as shown below:

Column 2, line 10, "antisotropically" should read

-- anisotropically --.

Column 2, line 68, "for" should read -- far --.

Signed and Sealed this

First Day of March 1983

[SEAL]

Attest:

GERALD J. MOSSINGHOFF

Attesting Officer    Commissioner of Patents and Trademarks